UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

FINISH-REMOVER.

1,167,640.  Specification of Letters Patent.  Patented Jan. 11, 1916.

No Drawing.  Application filed July 30, 1910. Serial No. 574,708.

*To all whom it may concern:*

Be it known that I, CARLETON ELLIS, a citizen of the United States, now residing at Montclair, Essex county, New Jersey, have made certain new and useful Inventions Relating to Finish-Removers, of which the following is a specification.

This invention relates to finish removers and relates especially to finish remover compositions which may contain amido-phenols, chlorinated phenols and other solvents and incorporated stiffening material which may include Montan wax.

A number of amido-phenols are desirable finish solvent or softening agents suitable for use in finish removers. Xylidin is quite satisfactory and the anisidins, such as ortho, meta and para-anisidin are also desirable solvents. Ortho-anisidin in its pure form has a boiling point of about two hundred and eighteen degrees C. and the ordinary commercial form is a solvent liquid having very little odor and possessing a somewhat basic or antacid character because of the presence of the amido group. Many chlorinated phenols are also desirable finish solvents which may with advantage be incorporated in finish removers. Among these solvents, the ortho, meta and para monochlorcresols may be used as well as chlorguaiacol, chlorcreosote and chlorinated wood creosote. These solvents may of course be incorporated with other finish and loosening agents, such as penetrating solvent material, that is, finish solvent or softening material of a generally benzolic character or action in removers such as benzol and its homologues, toluol, xylol and their commercial forms such as commercial toluol and the high boiling point coal tar solvent naphtha and also the somewhat analogous petroleum hydrocarbons such as benzin, light kerosene, the high boiling point petroleum product naphthenic acid having a boiling point of two hundred and fifty to three hundred degrees C. and a specific gravity of about 1.9 which may be separated from the alkali compounds formed in petroleum refining. Other suitable penetrating finish solvents are wood turpentine, turpentine, and Russian turpentine, which is a still better solvent for most finishes than ordinary turpentine and having a desirable odor, as well as tar oil, oil of camphor and the light or ethereal oils of camphor, and also chlorinated solvents such as carbon tetrachlorid, dichlorhydrin, epichlorhydrin, chlorbenzol, bensylchlorid and benzalchlorid, which is a very effective finish solvent and which together with benzylchlorid occur in chlorinated toluol, a non-inflammable body having desirable inflammability suppressing action in removers.

Suitable loosening finish solvent material may also be used with advantage in most cases, that is, solvents of a generally alcoholic character or action in removers such as methyl, ethyl, propyl, butyl, amyl, allyl, benzyl and other strict alcohols preferably in their commercial forms including denatured alcohol or their esters when combined with acetic, carbolic or other acids and many ketonic loosening solvents may be used, such as methyl ethyl ketone, ethyl butyl ketone, acetone, oil of acetone, methyl acetone, and their condensation derivatives and the secondary and tertiary alcohols and their derivatives.

For ordinary service it is desirable to incorporate suitable stiffening material with the composite solvents ordinarily employed so as to preferably have an effective film forming action and correspondingly suppress the evaporation of the solvents. Paraffin, ceresin, ozocerite, beeswax, Japan wax and other generally waxy thickening material may be used, Montan wax being an especially desirable hard wax having an effective thickening action under hot weather conditions. The crude Montan wax is a brownish material similar to ozocerite and containing montanic acid while the refined wax is white and somewhat crystalline. Other stiffening material such as wood flour, starch, infusorial earth, pyroxylin, other cellulose esters, scrap celluloid, and fatty, soapy or alkaline bodies may also be used. The use of such antacid soapy material having an alkaline reaction or of anilin or other antacid agents such as the amido-phenols referred to, are of course desirable with some chlorinated solvents which have an appreciable acid tendency. A desirable illustrative remover of this character, which is practically non-inflammable, may comprise ortho-anisidin ten parts, naphthenic acid fifteen parts benzal chlorid twenty-five parts, anilin five parts, monochlorcresol ten parts, benzyl alcohol forty parts, ethyl alcohol ten parts, with which the following thickening material may be incorporated; Montan wax four parts, paraffin three parts and ordinary laundry soap three parts.

Another desirable illustrative remover may comprise methyl acetate sixty parts, caustic soda two parts, ortho-anisidin fifteen parts, Montan wax two parts, paraffin wax two parts, celluloid scrap four parts, methyl acetone ten parts, methyl acetate twenty parts.

Another suitable illustrative remover may comprise ortho-anisidin ten parts, caustic soda two parts, chlorinated toluol twenty parts, paraffin wax two parts, bayberry tallow one part, celluloid scrap five parts and methyl acetate forty parts.

Another illustrative remover may be formed from ortho-anisidin twenty parts, naphthenic acid twenty parts, monochlorcresol twenty parts and ceresin wax five parts.

Another illustrative remover may comprise methyl acetate one hundred parts, caustic soda two parts, ortho-anisidin twenty parts, carbon tetrachlorid twenty parts, paraffin wax two parts.

Another desirable composition is one hundred parts ortho-anisidin, sixty parts ethyl alcohol, forty parts carbon tetrachlorid and ten parts paraffin wax.

Another suitable remover may comprise ninety parts ortho-anisidin, fifty parts naphthenic acid, fifty parts acetone, and twelve parts paraffin wax.

Having described this invention in connection with a number of illustrative ingredients, formulas and proportions to the details of which disclosure the invention is not of course to be limited, what is claimed is:

1. The non-inflammable finish remover comprising approximately ortho-anisidin ten parts, naphthenic acid fifteen parts, benzal chlorid twenty-five parts, anilin five parts, monochlorcresol ten parts, benzyl alcohol forty parts, ethyl alcohol ten parts and incorporated stiffening material including Montan wax four parts, paraffin wax three parts and laundry soap three parts.

2. The substantially non-inflammable finish remover comprising approximately ortho-anisidin ten parts, naphthenic acid fifteen parts, benzal chlorid twenty-five parts, monochlorcresol ten parts, benzyl alcohol forty parts, ethyl alcohol ten parts and incorporated antacid material and waxy stiffening material.

3. The substantially non-inflammable finish remover comprising approximately ortho-anisidin ten parts, naphthenic acid fifteen parts, benzal chlorid twenty-five parts, monochlorcresol ten parts, benzyl alcohol forty parts, ethyl alcohol ten parts, and incorporated stiffening material.

4. The finish remover comprising ortho-anisidin, naphthenic acid, benzal chlorid, monochlorcresol, loosening finish solvent material including an alcohol and incorporated stiffening material.

5. The substantially non-inflammable finish remover comprising approximately ortho-anisidin ten parts, naphthenic acid fifteen parts, benzal chlorid twenty-five parts, monochlorcresol ten parts, benzyl alcohol forty parts and ethyl alcohol ten parts.

6. The finish remover comprising ortho-anisidin, naphthenic acid, benzal chlorid, monochlorcresol, and loosening finish solvent material including an alcohol.

7. The non-inflammable finish remover comprising an amido-phenolic finish solvent, benzal chlorid and miscible loosening finish solvent material.

8. The finish remover comprising an amido-phenolic finish solvent and benzyl alcohol.

9. The finish remover comprising an amido-phenolic finish solvent and miscible composite finish solvent material including a chlorinated solvent.

10. The finish remover comprising ortho-anisidin and miscible finish solvent material comprising a loosening finish solvent.

11. The finish remover comprising ortho-anisidin and naphthenic acid.

12. The finish remover consisting substantially of composite finish softening material including an amido-phenolic finish solvent and naphthenic acid.

13. The finish remover consisting largely of composite organic finish softening material including an amido-phenolic finish solvent and monochlorcresol.

14. The finish remover consisting largely of composite organic finish softening material including an amido-phenolic finish solvent and miscible chlorinated solvent material including benzal chlorid and chlorinated phenolic material.

15. The finish remover consisting substantially of composite organic finish softening material including benzal chlorid.

CARLETON ELLIS.

Witnesses:
HARRY L. DUNCAN,
JESSIE B. KAY.